United States Patent Office 2,756,246
Patented July 24, 1956

2,756,246

NITRO DERIVATIVES OF ORGANOSILICON COMPOUNDS

Charles A. Burkhard, Alplaus, N. Y., assignor to General Electric Company, a corporation of New York No Drawing. Application February 8, 1954,
Serial No. 408,981

13 Claims. (Cl. 260—448.2)

This invention is concerned with a process for making organosilicon compositions containing nitrogen attached to silicon through aliphatic carbon. More particularly, the invention relates to a process which comprises effecting reaction between (1) an organosilicon compound containing an unsaturated aliphatic carbon radical attached directly to silicon and (2) nitric oxide having incorporated therein a catalytic quantity of a member of the group consisting of nitrosyl chloride, nitrosyl bromide, nitrogen oxy-acids, and the oxides of nitrogen other than nitrous oxide and nitric oxide. The invention also includes compositions prepared in accordance with the process described above which contain nitro, nitroso and oxime groups attached to silicon through aliphatic carbon.

Organosilicon compounds containing nitro and nitroso groups attached to silicon through aliphatic carbon are unknown in the art because the common methods of forming nitro compounds are inapplicable to the nitration of organosilicon compounds containing aliphatic carbon attached to a silicon atom. One of the common methods of nitrating aliphatic hydrocarbons is by the direct reaction of the compound with nitric acid at temperatures of 350 to 450° C. This reaction is not suitable for preparation of nitro and nitroso aliphatic silicon compounds since the conditions used cause cleavage of the carbon-silicon bond, leading to silica.

My method of nitrating organosilicon compounds containing alkenyl groups attached to a silicon atom has a very broad application in its field since it is a one step process for nitrating these compounds.

The process of the present invention is applicable to any organosilicon compound containing an alkenyl radical attached directly to silicon. These alkenyl silicon compounds include both organosilanes and organopolysiloxanes containing at least one alkenyl radical attached to silicon. The alkenyl organopolysiloxanes include linear, cyclic and branched chain organopolysiloxanes.

Among the silanes which may be used in the practice of the present invention are those having the formula:

(1) $(R)_n Si(R')_{4-n}$ where R is an alkenyl radical, e. g., vinyl, allyl, propenyl, butenyl, etc. radicals; and R' represents members selected from the class consisting of hydrogen; halogen, e. g., chlorine, fluorine, bromine, etc.; alkyl radicals, e. g., methyl, ethyl, propyl, butyl, octyl, decyl, etc. radicals; aryl radicals, e. g., phenyl, naphthyl, etc. radicals, alkaryl radicals, e. g., tolyl, xylyl, etc. radicals; aralkyl radicals, e. g., benzyl, phenylethyl, etc. radicals; halogenated aryl radicals, e. g., chlorophenyl, dichlorophenyl, etc. radicals; alkoxy radicals, e. g., methoxy, ethoxy, propoxy, pentoxy, heptoxy, etc. radicals; aryloxy radicals, e. g., phenoxy, etc. radicals; and $n$ is an integer equal to from 1 to 4, inclusive. Specific compounds included within the scope of Formula 1 include, for example, vinyltrimethylsilane, divinyldimethylsilane, tetravinylsilane, vinyltriethoxysilane, vinyldimethylmethoxysilane, vinyldimethylethoxysilane, vinyltrichlorosilane, vinyldimethylsilane, vinyldibutylchlorosilane, vinyltriethoxysilane, vinyltriphenoxysilane, vinyldiphenoxyfluorosilane, allyltrimethylsilane, diallyldimethylsilane, tetraallylsilane, allyldiethylsilane, allyldimethylchlorosilane, allyltriethoxysilane, diallyldiphenoxysilane, allylmethyldiphenoxysilane, diallyldi-(o-chlorophenyl)-silane, pentenyltribenzylsilane, etc.

The organopolysiloxanes of the present invention include organopolysiloxanes containing the structural unit (2) 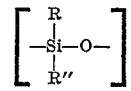

where R is an alkenyl radical as defined above and R'' is a member selected from the class consisting of hydrogen; alkenyl radicals as defined for R; alkyl radicals, e. g., methyl, ethyl, propyl, butyl, etc., radicals; aryl radicals, e. g., phenyl etc., radicals; haloaryl radicals, e. g., chlorophenyl, dichlorophenyl, pentachlorophenyl, etc., radicals. The structural siloxane unit of Formula 2 may be intercondensed with like members or with other siloxane units such as dimethylsiloxane units, methylethylsiloxane units, diphenylsiloxane units, methylphenylsiloxane units, etc., to form cyclic organopolysiloxanes containing from 3 to 20 or more siloxane units per molecule. The siloxane unit of Formula 2 may also be intercondensed with like units or other siloxane units to form linear or branched chain organopolysiloxanes which are chain-stopped with monofunctional groups such as, for example, trimethylsilyl units or hydroxy units.

The organopolysiloxanes of the present invention also include disiloxanes having the formula (3) $(Z)_{3-k}(R)_k SiOSi(R)_m (Z)_{3-m}$ where R is as defined above and Z represents monovalent hydrocarbon radicals selected from the class consisting of alkyl radicals, e. g., methyl, ethyl, propyl, butyl, etc. radicals; and aryl radicals, e. g., phenyl, naphthyl, etc. radicals; $m$ is an integer equal to from 1 to 3, inclusive, and $k$ is a whole number equal to from 0 to 3, inclusive.

Specific organocyclopolysiloxanes within the scope of the invention include, for example, vinylheptamethylcyclotetrasiloxane, allylpentamethylcyclotrisiloxane, octavinylcyclotetrasiloxane, etc. Disiloxanes included in the Formula 3 are, for example, vinylpentamethyldisiloxane, hexavinyldisiloxane, 1,3-diallyltetramethyldisiloxane, etc.

The alkenyl silicon compounds used in the practice of the present invention are well known in the art. Some of these compounds and their method of preparation are shown, for example, in U. S. Patents 2,645,628—Hurd; 2,595,727; 2,595,728; and 2,595,729—Swiss et al.; 2,505,431—Rust et al.; 2,465,731—Kropa; 2,445,795—Marsden; etc.

One suitable method for forming the compounds used in the practice of the present invention is to chlorinate an organosilicon compound containing at least one ethyl or higher alkyl radical attached to silicon and then to dehydrochlorinate the resulting chloroalkyl radical. The alkenyl organopolysiloxanes used in the present invention may be prepared, for example, by hydrolyzing compounds such as divinyldichlorosilane, vinylmethyldichlorosilane, etc., either alone or intermixed with other difunctional silanes such as dimethyldichlorosilane, diethyldichlorosilane, etc.

The reaction between the alkenyl silane or siloxane and nitric oxide is effected by passing nitric oxide through the liquid organosilicon compound. In order for the reaction to proceed at a rapid rate, the nitric oxide must have incorporated therein a catalytic quantity of nitrogen dioxide or a catalytic quantity of substance which will yield nitrogen dioxide in an atmosphere of nitric oxide. Such substances are, for example, nitrosyl chloride, nitrosyl bromide, nitrogen oxy-acids, and the oxides of nitrogen other than nitrous oxide and nitric oxide. The concentration of nitrogen dioxide-yielding substance may vary from a trace up to 50 to 75 per cent, by weight, of the nitric oxide. However, there is no advantage in using large quantities of the catalytic substance since the catalytic effect of the nitrogen dioxide-yielding substance is found when the concentration of this substance varies from a mere trace up to about 2 per cent. Preferably, 2 per cent is the upper limit of nitrogen dioxide-yielding substance used in the reaction. The ratio of nitric oxide to alkenyl radicals may vary within wide limits depending on the degree of addition to the alkenyl radical desired. This ratio may also vary because of the fact that gaseous nitric oxide may escape from the reaction mixture. In general, when complete addition is desired an equivalent excess of nitric oxide is used, e. g., from about three to ten moles of nitric oxide per mole of alkenyl radical. The temperature at which the reaction takes place may also vary through wide limits. Temperatures from 0° C., up to about 150 to 200° C., may be used. However, the reaction proceeds at a rapid rate at room temperature, i. e., about 20 to 25° C., and the reaction is preferably carried out at room temperature. The reaction may be carried out at pressures from atmospheric pressure up to 5 to 10 atmospheres, and preferably is carried out at atmospheric pressure to allow the use of standard equipment as opposed to high pressure equipment.

The net effect of the reaction of the alkenyl silicon compound with nitric oxide in the presence of a nitrogen dioxide producing catalyst is to add a nitro group and a nitroso group across the olefinic double bond of the alkenyl radical to form a nitrosite. The resulting compounds thus have a nitro group and a nitroso group attached to silicon through aliphatic carbon. Since the nitroso group has tautomeric properties the compounds formed sometimes contain a nitro group and an oxime group attached to silicon through aliphatic carbon. The term "nitroso" as used in the appended claims refers to the nitroso group, —N=O, and to its tautomer, the oxime group, =N—OH. In practice, some of the nitro-nitroso compounds prepared by the method of the present invention have been found to crystallize in the dimeric form. Although the exact mechanism of the reaction of the present invention will not be postulated, the net effect of the reaction is to form the nitrosite and to regenerate nitrogen dioxide so that only catalytic amounts of nitrogen dioxide are required.

The compounds prepared in accordance with the practice of the present invention may be described generically as having the $$\begin{array}{cc} NO_2 & NO \\ | & | \\ -CH- & CH- \end{array}$$

or $$\begin{array}{cc} NO_2 & N-OH \\ | & \| \\ -CH- & C- \end{array}$$

radicals attached directly to silicon or to aliphatic carbon which in turn is attached to silicon through a silicon carbon linkage.

Typical compounds produced by the method of the present invention include, for example, 1-nitro-2-nitroso-4-dimethyl-4-sila-6-heptene

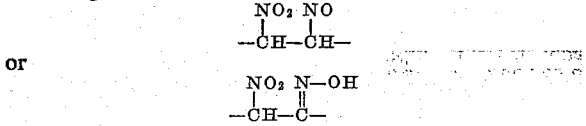

1-nitro-3,3-dimethyl-3-sila-2-butanone-oxime

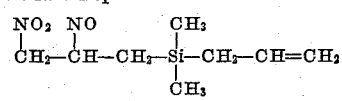

1-nitro-2-nitroso-3-pentamethyldisiloxanylpropane

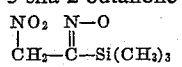

etc.

In order that those skilled in the art may better understand how the present invention may be practiced, the following examples are given by way of illustration and not by way of limitation.

*Example I*

Nitric oxide containing about 0.5 per cent nitrogen dioxide was bubbled through about 10 ml. of diallyldimethylsilane for about one hour at room temperature at atmospheric pressure. A yellow color developed and the dimer of 1-nitro-2-nitroso-4-dimethyl-4-sila-6-heptene separated from the solution. This product after recrystallization from an acetone to water mixture melted at 89 to 90° C. going to a blue-green liquid. Chemical analysis of the product showed it to contain 43.9% carbon, 7.2% hydrogen, and 13.1% nitrogen. (Theoretical: 44.44% carbon, 7.46% hydrogen, 12.95% nitrogen.)

*Example II*

Nitric oxide containing about 0.5 per cent nitrogen dioxide was bubbled slowly through about 3 ml. of allylpentamethyldisiloxane at room temperature at atmospheric pressure. The reaction was continued for about one hour and the reaction mixture was allowed to stand overnight. The crystalline dimer of 1-nitro-2-nitroso-3-pentamethyldisiloxanylpropane which separated from the reaction mixture had a melting point of from 95.5 to 96° C. The product melted to a blue-green liquid. Chemical analysis of the product showed it to contain 36.8% carbon, 7.7% hydrogen and 11.1% nitrogen. (Theoretical: 36.34% carbon, 7.63% hydrogen and 10.60% nitrogen.)

*Example III*

An autoclave was charged with 63 g. of trimethylvinylsilane and pressurized with nitric oxide containing about 0.5 per cent nitrogen dioxide to 300 p. s. i. The reaction was carried on for about three hours at a temperature of about 25 to 30° C. At the end of this time the reaction mixture was removed from the autoclave and water was added to precipitate the 1-nitro-3,3-dimethyl-3-sila-2-butanone oxime. After purification of the compound by solution and recrystallization, chemical analysis showed it to contain 6.4% hydrogen and 15.9% nitrogen as compared with the theoretical values of 6.8% hydrogen and 15.9% nitrogen.

The compounds described herein have various uses. Because of the stability of the nitro and nitroso groups on the carbon atoms, these compounds may be used as intermediates in the preparation of pharmaceuticals and may be used per se as a basis for new silicon-containing rubbers and resins containing nitrogen. Compounds of the present invention may also be reduced to form organosilicon compounds containing amine radicals attached to silicon through aliphatic carbon.

What I claim as new and desire to secure by Letters Patent of the United States is:

1. The method of preparing an organosilicon derivative which comprises effecting reaction between (1) an organosilicon compound containing an alkenyl radical attached directly to silicon and (2) nitric oxide in the presence of up to 2 percent by weight, based on the weight of said nitric oxide, of a member of the class consisting of nitrosyl halides and oxides of nitrogen other than nitrous oxide and nitric oxide to form an organosilicon compound containing nitro and nitroso groups attached to an aliphatic carbon radical which is attached to silicon through a carbon-silicon linkage.

2. The method of preparing an organosilicon derivative which comprises bubbling nitric oxide containing up to 2 percent by weight, based on the weight of said nitric oxide, of a member of the class consisting of nitrosyl halides and oxides of nitrogen other than nitrous oxide and nitric oxide through an organosilicon compound containing an alkenyl radical attached directly to silicon to form an organosilicon compound containing nitro and nitroso groups attached to an aliphatic carbon radical which is attached to silicon through a carbon-silicon linkage.

3. The method of preparing an organosilicon derivative which comprises effecting reaction between (1) an organosilicon compound containing an alkenyl radical attached directly to silicon and (2) nitric oxide in the presence of up to 2 percent by weight, based on the weight of said nitric oxide, of nitrogen dioxide to form an organosilicon compound containing nitro and nitroso groups attached to an aliphatic carbon radical which is attached to silicon through a carbon-silicon linkage.

4. The process of preparing an organosilane derivative which comprises effecting reaction between an organosilane having the formula:

$$(R)_nSi(R')_{4-n}$$

where R is an alkenyl radical and R' represents members selected from the class consisting of hydrogen, halogen, alkyl, aryl, aralkyl, halogenated aryl, alkoxy, and aryloxy radicals and $n$ is an integer equal to from 1 to 4, inclusive, an nitric oxide in the presence of up to 2 percent by weight, based on the weight of said nitric oxide, of a member of the class consisting of nitrosyl chlorides and oxides of nitrogen other than nitrous oxide and nitric oxide to form an organosilane compound containing nitro and nitroso groups attached to an aliphatic carbon radical which is attached to silicon through a carbon-silicon linkage.

5. The process of preparing an organopolysiloxane derivative which process comprises effecting reaction between (1) an organopolysiloxane containing the intercondensed siloxane unit

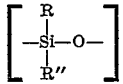

where R is an alkenyl radical and R'' is a member selected from the class consisting of alkenyl, alkyl, aryl, and haloaryl radicals and (2) nitric oxide in the presence of up to 2 percent by weight, based on the weight of said nitric oxide, of a member of the class consisting of nitrosyl chlorides and oxides of nitrogen other than nitrous oxide and nitric oxide to form an organopolysiloxane containing nitro and nitroso groups attached to an aliphatic carbon radical which is attached to silicon through a carbon-silicon linkage.

6. The process of preparing an organopolysiloxane derivative which process comprises effecting reaction between (1) a compound having the formula $$(Z)_{3-k}(R)_kSiOSi(R)_m(Z)_{3-m}$$

where R is an alkenyl radical, Z represents members selected from the class consisting of alkyl and aryl radicals, $m$ is an integer equal to from 1 to 3, inclusive, and $k$ is a whole number equal to from 0 to 3, inclusive, and (2) nitric oxide in the presence of up to 2 percent by weight, based on the weight of said nitric oxide, of a member of the class consisting of nitrosyl chlorides and oxides of nitrogen other than nitrous oxide and nitric oxide to form an organodisiloxane containing nitro and nitroso groups attached to an aliphatic carbon radical which is attached to silicon through a carbon-silicon linkage.

7. The method of forming a derivative of diallyldimethylsilane containing nitro and nitroso groups attached to the allyl radical which comprises effecting reaction between diallyldimethylsilane and nitric oxide in the presence of up to 2 percent by weight, based on the weight of said nitric oxide, of nitrogen dioxide.

8. The method of preparing a derivative of allylpentamethyldisiloxane which contains nitro and nitroso groups attached to the allyl radical which comprises effecting reaction between allylpentamethyldisiloxane and nitric oxide in the presence of up to 2 percent by weight, based on the weight of said nitric oxide, of nitrogen dioxide.

9. The method of preparing a derivative of trimethylvinylsilane containing nitro and oxime groups attached to the vinyl radical which comprises effecting reaction between trimethylvinylsilane and nitric oxide in the presence of up to 2 percent by weight, based on the weight of said nitric oxide, of nitrogen dioxide.

10. Organosilicon compounds selected from the class consisting of (A) an organosilane containing at least 1 aliphatic hydrocarbon radical attached to silicon, said aliphatic hydrocarbon radical containing a nitro and a nitroso group, the remaining valences of silicon being satisfied by members selected from the class consisting of hydrogen, halogen, alkyl radicals, aryl radicals, aralkyl radicals, haloaryl radicals, alkoxy radicals, and aryloxy radicals, and (B) an organopolysiloxane containing at least 1 aliphatic hydrocarbon radical attached to silicon, said aliphatic hydrocarbon radical containing a nitro and a nitroso group, with the remaining valences of silicon other than valences which make up the siloxane chain being satisfied by members selected from the class consisting of alkyl, aryl, and haloaryl radicals.

11. A composition of matter selected from the class consisting of 1 - nitro - 2 - nitroso - 4 - dimethyl - 4 - sila - 6 - heptene,

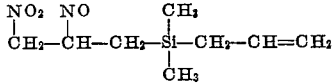

and the dimer thereof.

12. A composition of matter selected from the class consisting of 1 - nitro - 2-nitroso-3-pentamethyldisiloxanylpropane,

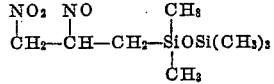

and the dimer thereof.

13. 1 - nitro - 3,3 - dimethyl-3-sila-2-butanone oxime,

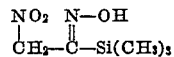

References Cited in the file of this patent

Michael: "Jour. Org. Chem." (1939), page 172.
Bloomfield et al.: "Jour. Chem. Soc." (London), 1944, pages 120–4.